Feb. 21, 1928.
F. A. HALLECK
VALVE MECHANISM
Filed Jan. 30, 1922
1,659,815
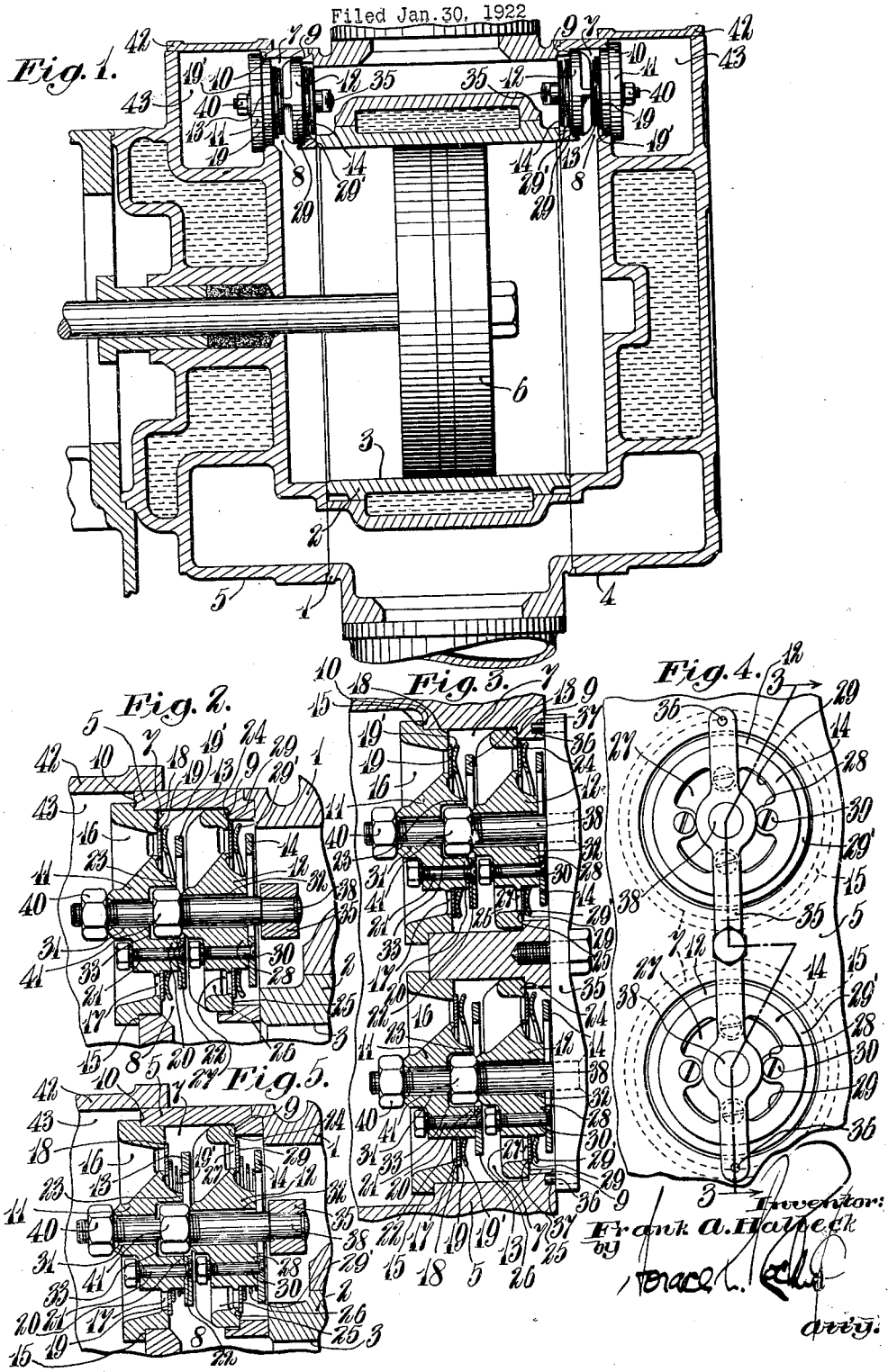

Patented Feb. 21, 1928.

1,659,815

UNITED STATES PATENT OFFICE.

FRANK A. HALLECK, OF OAK PARK, ILLINOIS, ASSIGNOR TO SULLIVAN MACHINERY COMPANY, A CORPORATION OF MASSACHUSETTS.

VALVE MECHANISM.

Application filed January 30, 1922. Serial No. 532,741.

My invention relates to valve mechanisms, and more particularly to valve mechanisms for use on compressors or pumps.

An object of my invention is to provide an improved valve mechanism for pumping machinery. Another object of my invention is to provide an improved combined inlet and discharge valve mechanism for pumping machinery. A further object of my invention is to provide an improved combined inlet and discharge valve mechanism for pumping machinery so constructed as to permit easy and accurate insertion and removal of the parts. A still further object of my invention is to provide an improved valve mechanism in which the machine work may be a minimum and in which a device which may be readily assembled may be produced. Other objects and advantages of my invention will hereinafter more fully appear.

In the accompanying drawings I have shown for purposes of illustration one form which my invention may assume in practice.

In these drawings,—

Fig. 1 is a view in central vertical section through a pump or compressor cylinder provided with the illustrative form of my improved valve mechanism which is shown therein in elevation.

Fig. 2 is a central section on a plane corresponding to the plane of Fig. 1 through one of the combined inlet and discharge valves.

Fig. 3 is a section on the line 3—3 of Fig. 4.

Fig. 4 is a view of a fragment of the cylinder head removed from the cylinder and showing the method of assembling the valves in the head.

Fig. 5 is a modification.

In the accompanying drawings I have shown a compressor having a cylinder 1 comprising a cylinder member proper 2 having a bore 3 and head members 4 and 5. A piston 6 reciprocates in the cylinder and serves to alternately draw in and compress charges of air. In each of cylinder heads 4 and 5 there are arranged a plurality of sockets or valve cage receiving chambers 7 which are arranged in series extending part way around the periphery of the cylinder, but of which only one is shown, at each end of the cylinder in Fig. 1. These chambers 7 communicate through an open side passage 8 with the cylinder bore and are provided with coaxially arranged annular surfaces 9 and 10 against which the removable portions of the valve mechanism may be securely clamped.

In the illustrative embodiment of my invention shown, each of the valve mechanisms will be noted to be made up of two major seat portions designated, respectively 11 and 12, and two guard portions designated, respectively 13 and 14. The valve portion 11 is annular in outline and is provided with a shoulder 15 to cooperate with the shoulder 10 in the cylinder head and against which latter shoulder it is tightly pressed when the parts are assembled. The member 11 is traversed by a series of passages 16 which open into an annular port 17 in a valve seat surface 18. The valve seat surface 18 is machined to permit the cooperation therewith of an annular valve 19 of relatively thin sheet metal and inside the valve seat surface 18 are arranged a series of bosses 20 herein four in number and equally spaced, which bosses serve as guiding means for the inner edge of the valve 19 and have holes through them through which bolts 21 pass, these bolts also passing through inwardly projecting ears 22 formed on a generally annular guard plate 13 and holding the guard plate rigidly against a shoulder 23 on the member 11. A transversely bowed annular spring 19' is arranged between the guard plate 13 and the valve 19 and engages the same along parallel lines.

The valve portion 12 is very similar to the portion 11. This portion also has an annular shoulder, 24, adapted to cooperate with the shoulder 9 on the cage receiving chamber, the diameters of the portion 12 and the shoulder 9 being less than those of the portion 11 and the shoulder 10. The portion 12 is provided with a plane valve seat surface 25 and is traversed by a series of passages 26 opening into an annular port 27 opening through the seat surface 25. A series of spaced bosses 28, corresponding with the bosses 20, serves to guide an annular valve 29 which seats upon the surface 25; and a guard 14, above mentioned, is secured by bolts 30 to the member 12, these bolts passing through holes in the bosses 28. A spring 29' made of an annular transversely bowed piece of spring material is disposed between the valve 29 and the guard 14 and serves to maintain the valve normally seated. It will be noted that the entire central portions of the guards 13 and 14 are cut away and that the members 11 and 12 are centrally bored to form bores of different diameters, these bores being designated respectively 31 and 32, and the bore 31 being counterbored for a distance as at 33.

For the purpose of holding the valve elements in assembled relation the following means is employed. Clamping bars 35, herein adapted to cooperate in securing two valve mechanisms, are provided with dowel pins 36 seating in holes 37 in the adjacent ends of the head members. These bars are bored to receive studs 38, which are located in axial alinement with the cage chambers. The studs are constructed to be a loose fit for the bores 31 and 32 and are threaded at suitable points to receive nuts 40 and 41. These studs are riveted to the bars and the whole is then placed against the cylinder engaging end of the head. The assembled parts 14 and 12 are slipped over the studs and the nuts 41 put on and tightened up to draw the shoulder 24 against the shoulder 9. The parts 13 and 11 are then slipped on the studs and the bolts 40 put on and tightened up. This draws up the shoulders 15 hard against the shoulders 10. Cover plates 42, adapted to close hand holes 43 in the rim of the head, can then be put in place and the device is ready to operate.

The operation of my improved valve mechanism will be readily apparent. Considering the structure shown in Figures 1 and 2, as the piston moves to the right the pressure within the cylinder will be reduced and the valves 19 will be unseated, flattening the springs 19', and air will enter the cylinder. On the opposite stroke of the piston the valves 19 will be closed and the valves 29 will unseat to permit discharge of the fluid being pumped, the springs 29' then being flattened. It will be evident that the valve is securely mounted, the several parts being individually adjustable to a tight seat and by reason of the fact that the valves are put in by pairs the entire work can be done from the side of the cylinder head, to which access is had by way of the hand holes 43.

In the modification shown in Fig. 5, spiral springs 19' and 29' of resilient ribbon-like form are used. The device is otherwise the same as my form first described.

While I have in this application specifically described two embodiments which my invention may assume in practice, it is to be understood that these forms are shown for illustrative purposes only, and that the invention may be modified and embodied in various other forms without departing from its spirit or the scope of the appended claims.

What I claim as new and desire to secure by Letters Patent is:

1. In a pump, a plurality of valve receiving chambers at one end of a pump cylinder, a plurality of valves in said chambers, and means for holding said valves in said chambers including clamping members cooperating with the valves in more than one chamber.

2. In a pump, a plurality of valve receiving chambers having parallel axes, a plurality of valves therein, and means for holding said valves in said chambers comprising holding-in bolts extending through said chambers and engaging in pairs a clamping bar extending across the ends of said chambers.

3. In a pump, a plurality of valve receiving chambers having parallel axes disposed in the head of a pump cylinder, valve mechanisms in said chambers, a clamping bar extending across the ends of a plurality of said chambers, and holding-in bolts secured in said bar and engaging said valve mechanisms.

4. In a pump, a plurality of valve receiving chambers, a plurality of valves in said chambers, and means for holding said valves in said chambers including threaded elements extending longitudinally of said chambers and connected at the inner ends of said chambers by a transversely extending portion.

5. An article of manufacture comprising an anchor member adapted to be associated with a compressor cylinder and having a plurality of spaced studs projecting therefrom each adapted to receive in coaxial relation therewith a complete valve and valve seat mechanism.

6. An article of manufacture comprising an anchor member adapted to be associated with a compressor valve chest and having a plurality of studs projecting therefrom each adapted to receive a plurality of complete valve and valve seat mechanisms and having means to hold the same thereon.

7. In a pump, means providing a cylinder having inlet and discharge passages, a valve cage receiving chamber being formed intermediate said passages, inlet and discharge valves spaced axially in said chamber, and means for holding the same in said chamber including a transverse member disposed in one of said passages beyond the end of said chamber and anchored to resist movement toward said chamber, and a single bolt extending through the valves longitudinally of the chamber and adapted to pull the valves toward said transverse member to secure the valves in place in said chamber.

8. In a pump, a member having a valve cage receiving chamber formed therein, inlet and discharge valves spaced axially in said chamber, and means for holding the same in said chamber including a bolt extending through them longitudinally of the chamber and a transverse member abutting said first mentioned member adjacent the end of the chamber, said transverse member with the bolt and said valves being necessarily removable in opposite directions relative to said chamber.

9. In a pump, a member having a valve cage receiving chamber formed therein, inlet and discharge valves spaced axially in said chamber and means for holding the same in said chamber including a bolt extending through them longitudinally of the chamber and a transverse member engaging said first mentioned member adjacent the end of said chamber, said transverse member being of greater length than the width of said chamber, said bolt and valves being necessarily removable in opposite directions from said chamber.

10. In a pump, a cylinder having inlet and discharge passages, a valve mechanism receiving chamber being formed intermediate said passages, inlet and discharge valves in said chamber, and means including a T-shaped clamping element disposed across one of said passages and having its stem placed under tension to hold said valves in said chamber.

11. In combination, a compressor cylinder, a unitary valve mechanism for controlling flow of fluid from only one end thereof comprising a plurality of valve seat elements having annular port means therein, a plurality of guard elements, a plurality of annular valves between said seat and guard elements, transversely bowed annular springs between said valves and guard elements, and means including a stud extending axially of all of said elements and a plurality of nuts for holding them in assembled relation.

12. In a valve mechanism, a plurality of valve seat elements having when assembled ported annular valve seating surfaces in spaced parallel planes, a plurality of guard elements, annular valve elements arranged between said seating surfaces and guard elements, spring elements between said valve elements and guard elements, a chamber having shoulders on which certain of said elements are adapted to seat, and means for holding said elements in assembled relation in said chamber including a stud held against longitudinal movement in said chamber during removal of said valves and nuts removable in the same direction longitudinally of said stud for separately holding certain of said elements in position.

13. The combination with a pump cylinder having inlet and discharge passages and a valve mechanism receiving chamber providing seats for inlet and discharge valve mechanisms, said chamber being associated with only one end of said cylinder, of inlet and discharge valve mechanisms in said chamber, and means including a T-shaped clamping member having a head secured transversely of one of said passages and holding both said valve mechanisms on their seats in said chamber, said head being of a length at least equal to the width of one of said valve mechanisms.

14. In a pump, a cylinder, a cylinder head abutting against said cylinder, a chamber in said cylinder, a chamber in said head opening into said first mentioned chamber, a shoulder in said head, a valve cage in said chamber seating upon said shoulder, a stud passing through said valve cage, a nut cooperating therewith to hold said cage against said shoulder, and means engaged by said stud and against which the same reacts when said nut is tightened arranged within said cylinder.

15. In combination with a compressor cylinder, means forming a chamber, valve mechanism insertible in said chamber and movable in one direction to its normal assembled position, a second chamber having an end wall and disposed adjacent said valve chamber, said second chamber having communication with one end of said cylinder, and means having a portion abutting the wall of one of said chambers and having another portion extending through a plane containing said wall and into the other chamber for holding said valve mechanism in position, said means being removable only on movement in the direction of the movement of said valve mechanism towards assembled position.

16. In combination, a compressor cylinder, means forming a valve chamber, valve mechanism therein removable therefrom only in one direction, a second chamber adjacent said valve chamber and having communication with only one end of said cylinder through said mechanism and said other chamber, means having at least a portion disposed within said second chamber and adapted to have operative engagement with said mechanism to hold the same in position, and means whereby said holding means upon disengagement is removable only in a direction opposite to said other direction.

17. In combination, a compressor cylinder having inlet and discharge passages, a valve mechanism receiving chamber being formed intermediate said passages, inlet and discharge valve mechanisms insertible in said chamber, one of said passages comprising a second chamber adjacent said valve chamber, and means for holding said valve mechanisms in position by tension, said means having a portion engaging a wall of said second chamber and a cooperating portion extending through a plane containing said wall into said valve mechanism receiving chamber so as to have operative engagement with said mechanism to effect said holding action.

18. In combination, a compressor cylinder, means forming a chamber, valve mechanism removable therefrom in one direction, a second chamber adjacent said valve chamber and having communication with an end of said cylinder through said mechanism and said other chamber, and means for holding said mechanism in position, said means having a portion engaging a wall of one of said chambers and a cooperating portion extending through a plane containing said wall and into the other chamber so as to have operative engagement with said mechanism to effect said holding action, said latter portion being movable upon removal of said mechanism in only a direction opposite to said other direction.

19. In combination, a compressor cylinder, means forming a chamber, valve mechanism insertible therein from one direction, a second chamber adjacent said valve chamber and having communication with an end of said cylinder through said mechanism and said other chamber, means for holding said mechanism in position, said means having a portion engaging a wall of one of said chambers and a cooperating portion extending through a plane containing said wall and into the other chamber to have operative engagement with said mechanism to effect said holding action, and means whereby one of said portions is placed under tension during holding of said valve.

20. In a valve mechanism, a plurality of separate coaxial valve seat elements one of which has a portion with a recess therein, and means for holding another of said elements in position including a stud and a nut which is disposed within the recess of said first element.

21. In a valve mechanism, a plurality of separate coaxial valve seat elements one of which has a valve guard supporting portion having a recess therein, said valve guard supporting portion providing an abutment surface against which a guard may be supported, and means for holding said elements in position including axial means having a radially extending portion disposed within said recess for holding another of said elements in position.

22. In combination, a plurality of coaxial valve mechanisms each complete of itself and disposed, when assembled, in such relation that a plane to which the valve axis is perpendicular cuts elements of each mechanism, and means for holding said mechanisms in position including a single axial stud having associated therewith a radial portion disposed adjacent said overlying portions.

23. In combination, coaxial valve mechanisms each comprising a seat, a guard and a valve, and means for holding said mechanisms in assembled relation with the guard of one closely adjacent the seat of the other comprising retaining means including means providing a shoulder engaging one of said mechanisms, said other mechanism providing a recess in which said shoulder providing means is received.

24. In combination, coaxial valve mechanisms each comprising a ported seat member formed with axially extending portions, a valve cooperating with said ports, a guard therefor secured in contact with said portions, and a spring disposed between said guard and valve, and means for holding said mechanisms in assembled relation with the guard of one closely adjacent the seat member of the other comprising retaining means including means providing a shoulder engaging one of said mechanisms, said other mechanism providing a recess in which said shoulder providing means is received.

25. In combination, a plurality of coaxial valve mechanisms each constituted of separable seat and guard elements independent of the elements of the other and disposed, when assembled, in such relation that a plane to which the valve axis is perpendicular cuts elements of each mechanism, and retaining means for holding the mechanisms in rigid assembled relation.

26. In combination, a compressor cylinder, a unitary valve mechanism for controlling flow of fluid with respect to only one end thereof comprising a plurality of valve seat elements having annular port means therein, a plurality of guard elements, a plurality of annular valves between said seat and guard elements, spring means between said valves and guard elements, and means including a stud individual to the valve mechanism at said end of the cylinder and extending axially through all of the elements thereof, and a plurality of nuts for holding said elements in assembled relation.

In testimony whereof I affix my signature.

FRANK A. HALLECK.